United States Patent
Qin et al.

(10) Patent No.: US 9,740,515 B2
(45) Date of Patent: Aug. 22, 2017

(54) EXCEPTION HANDLING METHOD, APPARATUS, AND CLIENT

(71) Applicant: Huawei Technologies Co., Ltd., Shenzhen, Guangdong (CN)

(72) Inventors: Jin Qin, Nanjing (CN); Pei Dang, Nanjing (CN); Deepanshu Gautam, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 802 days.

(21) Appl. No.: 14/143,946

(22) Filed: Dec. 30, 2013

(65) Prior Publication Data

US 2014/0115587 A1   Apr. 24, 2014

Related U.S. Application Data

(63) Continuation of application No. PCT/CN2012/078524, filed on Jul. 12, 2012.

(30) Foreign Application Priority Data

Nov. 14, 2011  (CN) .......................... 2011 1 0359792
Dec. 12, 2011  (CN) .......................... 2011 1 0412168

(51) Int. Cl.
  *G06F 9/46*    (2006.01)
  *G06F 9/455*   (2006.01)
  *H04L 12/24*   (2006.01)

(52) U.S. Cl.
  CPC ...... *G06F 9/45533* (2013.01); *H04L 41/0672* (2013.01)

(58) Field of Classification Search
  CPC .................. G06F 9/45533; H04L 41/0672
  See application file for complete search history.

(56) References Cited

U.S. PATENT DOCUMENTS 7,003,778 B2   2/2006   Sokolov
7,698,376 B2   4/2010   Lin et al.
(Continued)

FOREIGN PATENT DOCUMENTS

CN   101794243 A   8/2010
CN   101938368 A   1/2011
(Continued)

OTHER PUBLICATIONS

1st Office Action in corresponding Chinese Patent Application No. 201110412168.X (Oct. 31, 2016).

*Primary Examiner* — James J Lee
(74) *Attorney, Agent, or Firm* — Leydig, Voit & Mayer, Ltd.

(57) ABSTRACT

Embodiments of the present invention disclose an exception handling method, apparatus, and client. The method includes: receiving, by a virtual management server, an exception notification sent by a virtual machine that interacts with a first client, where the exception notification at least carries a user identifier and an application identifier; and storing, according to a stored exception handling mode corresponding to the user identifier and the application identifier, data of the virtual machine or application data of an application corresponding to the application identifier, and releasing resources of the virtual machine. According to the present invention, different exception handling methods can be customized for different applications and users according to requirements, the client can also store a usage state of a user at exception occurrence time or at the time nearest to the exception occurrence time, and the capacity and efficiency of an online application system are improved.

15 Claims, 9 Drawing Sheets

(56) References Cited

U.S. PATENT DOCUMENTS

| | | | |
|---|---|---|---|
| 7,882,247 B2 | 2/2011 | Sturniolo et al. | |
| 2004/0117803 A1 | 6/2004 | Srivastava et al. | |
| 2004/0221203 A1* | 11/2004 | Ruhlen | G06F 9/4843 |
| | | | 714/38.14 |
| 2005/0132363 A1 | 6/2005 | Tewari et al. | |
| 2007/0174429 A1* | 7/2007 | Mazzaferri | G06F 3/1415 |
| | | | 709/218 |
| 2007/0234358 A1 | 10/2007 | Hattori et al. | |
| 2007/0244938 A1* | 10/2007 | Michael | G06F 11/1458 |
| 2008/0301770 A1* | 12/2008 | Kinder | H04L 63/0823 |
| | | | 726/2 |
| 2009/0083736 A1 | 3/2009 | Goto | |
| 2009/0216816 A1* | 8/2009 | Basler | G06F 11/1464 |
| 2010/0070678 A1 | 3/2010 | Zhang et al. | |
| 2010/0131654 A1* | 5/2010 | Malakapalli | H04L 67/08 |
| | | | 709/227 |
| 2010/0299665 A1 | 11/2010 | Adams | |
| 2010/0306764 A1 | 12/2010 | Khanna | |
| 2010/0332890 A1 | 12/2010 | Chen et al. | |
| 2011/0153838 A1* | 6/2011 | Belkine | G06F 9/505 |
| | | | 709/227 |
| 2011/0167159 A1* | 7/2011 | Bethlehem | H04L 63/102 |
| | | | 709/226 |
| 2011/0219373 A1* | 9/2011 | Nam | G06F 9/455 |
| | | | 718/1 |
| 2011/0251992 A1* | 10/2011 | Bethlehem | H04L 12/2863 |
| | | | 707/610 |
| 2012/0084369 A1* | 4/2012 | Henriquez | H04L 67/08 |
| | | | 709/206 |
| 2013/0061089 A1* | 3/2013 | Valiyaparambil | G06F 8/68 |
| | | | 714/15 |
| 2013/0066945 A1* | 3/2013 | Das | G06F 15/16 |
| | | | 709/203 |

FOREIGN PATENT DOCUMENTS

| | | |
|---|---|---|
| CN | 102073556 A | 5/2011 |
| CN | 102204210 A | 9/2011 |
| EP | 1306753 A2 | 5/2003 |

* cited by examiner

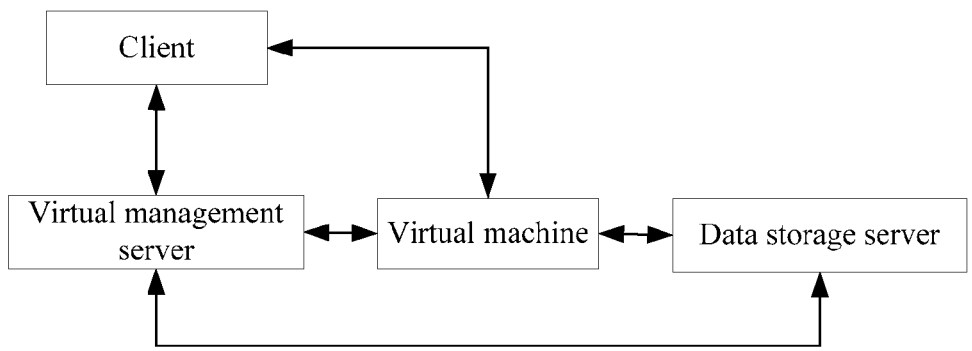

FIG. 1

```
A virtual management server receives an exception notification sent
by a virtual machine that interacts with a first client, where the          201
exception notification at least carries a user identifier and an
application identifier
```

```
The virtual management server stores, according to a stored
exception handling mode corresponding to the user identifier and the        202
application identifier, data of the virtual machine or application data
of an application corresponding to the application identifier, and
releases resources of the virtual machine
```

FIG. 2

EXCEPTION HANDLING METHOD, APPARATUS, AND CLIENT

CROSS-REFERENCE TO RELATED APPLICATIONS

This application is a continuation of International Application No. PCT/CN2012/078524, filed on Jul. 12, 2012, which claims priority to Chinese Patent Application No. 201110359792.8, filed on Nov. 14, 2011, and Chinese Patent Application No. 201110412168.X filed on Dec. 12, 2011, all of which are hereby incorporated by reference in their entireties.

TECHNICAL FIELD

The present invention relates to the field of online applications, and in particular, to an exception handling method, apparatus, and client.

BACKGROUND

An online application server may be generally referred to as an online application platform on which various applications developed by a third party may be deployed. A client may remotely connect to the online application platform to experience these applications. A general interaction process between the online application platform and the client is as follows: The client uploads an input event generated by a user operation to the server; after receiving the event, the server performs computation and handling, and sends a picture response result after the handling to the client; and after receiving the picture, the client displays it locally. In this online application scenario, the running and handling of all applications are carried out on the server, and the client is only responsible for uploading a user's operation input to the server, receiving the picture, and decoding and displaying the picture. However, from the perspective of a user side, the user feels as if the user is operating local applications.

An existing remote desktop system supports automatic reconnection after an exception occurs. A remote desktop MSTSC (Microsoft Terminal Services Client) provided by the Microsoft Windows operating system is used as an example. Automatic reconnection means that when a network exception occurs, the client may reconnect to a same session to which the client is previously connected, without re-sending verification information. After the client establishes a connection with the server successfully, the server sends an automatic reconnection cookie to the client. The cookie is bound to a current session and stored on the client. When a connection exception occurs, the client encrypts the cookie and sends the encrypted cookie to the server. The server verifies the cookie. If the verification is successful, it indicates that the currently connected client and the previously disconnected client are the same client, and therefore the server recovers the previously session, so that the client resumes the previous session to continue operations on the remote desktop.

It is found through analysis that the prior art has at least the following disadvantages: For an online application system, because a virtual machine may be allocated to multiple users for use simultaneously, when disconnection occurs due to an exception, if the virtual machine allows applications to continue running and waits for the user to connect, without releasing resources or performing any storage with respect to the running of the applications, resources of the virtual machine are occupied, and the capacity and efficiency of the online application system are also reduced, and furthermore, when the client reconnects, the client may fail to continue the operations performed at the occurrence of the exception.

SUMMARY

Embodiments of the present invention provide an exception handling method, apparatus, and client. The technical solutions are as follows:

An exception handling method includes: receiving, by a virtual management server, an exception notification sent by a virtual machine that interacts with a first client, where the exception notification at least carries a user identifier and an application identifier; and storing, by the virtual management server according to a stored exception handling mode corresponding to the user identifier and the application identifier, data of the virtual machine or application data of an application corresponding to the application identifier, and releasing resources of the virtual machine.

Before the receiving, by a virtual management server, an exception notification sent by a virtual machine, the method includes:

receiving, by the virtual management server, a first connection request sent by the first client, where the first connection request at least carries the user identifier and the application identifier; and determining and storing, by the virtual management server according to the first connection request, the exception handling mode corresponding to the user identifier and the application identifier.

The determining and storing, by the virtual management server according to the first connection request, the exception handling mode corresponding to the user identifier and the application identifier specifically include:

when the first connection request carries the application identifier and the user identifier, obtaining, according to the application identifier, a list of exception handling modes that is supported by the application; sending the list of exception handling modes to the first client, so that the first client selects an exception handling mode from the list of exception handling modes; and determining and storing the exception handling mode selected by the first client as the exception handling mode corresponding to the user identifier and the application identifier; or when the first connection request carries the application identifier, the user identifier, and a specified exception handling mode, obtaining, by the virtual management server according to the application identifier, a list of exception handling modes that is supported by the application, and determining whether the list of exception handling modes includes the specified exception handling mode; and when determining that the list of exception handling modes includes the specified exception handling mode, determining and storing the specified exception handling mode as the exception handling mode corresponding to the user identifier and the application identifier; or when determining that the list of exception handling modes does not includes the specified exception handling mode, sending, by the virtual management server, the list of exception handling modes to the first client, receiving an exception handling mode selected by the first client from the list of exception handling modes, and determining and storing the exception handling mode selected by the first client as the exception handling mode corresponding to the user identifier and the application identifier; or when the first connection request carries the application identifier, the user identifier, and a specified exception handling mode, determining and storing, by the virtual management server, the specified exception handling mode as the exception handling mode corresponding to the user identifier and the application identifier.

The storing, by the virtual management server according to a stored exception handling mode corresponding to the user identifier and the application identifier, data of the virtual machine or application data of an application corresponding to the application identifier, and releasing resources of the virtual machine specifically include:

when the exception handling mode corresponding to the user identifier and the application identifier is an application storage mode, determining, by the virtual management server according to preset logic of the application, that running data of the application needs to be stored, obtaining, from the virtual machine according to a configuration file of the application, user personal data indicated by the configuration file, storing the user personal data, the application identifier, and the user identifier to a data storage server, quitting the application, releasing the resources of the virtual machine, and updating a state of the virtual machine; or when the exception handling mode corresponding to the user identifier and the application identifier is a virtual machine state storage mode, generating, by the virtual management server, snapshot data of the virtual machine according to a current state of the virtual machine, storing the generated snapshot data of the virtual machine, the application identifier, virtual machine information, a virtual machine identifier, and the user identifier to a data storage server, releasing the resources of the virtual machine, and updating a state of the virtual machine.

After the storing, by the virtual management server according to an exception handling mode corresponding to the user identifier, data of the virtual machine or application data of an application indicated by the application identifier, and releasing resources of the virtual machine, the method further includes:

receiving, by the virtual management server, a second connection request sent by a second client, where the second connection request carries the user identifier and the application identifier;

determining, by the virtual management server according to the second connection request, that an application indicated by the second connection request requires exception recovery;

sending, by the virtual management server, an exception recovery query message to the second client;

receiving, by the virtual management server, an exception recovery request of the second client, and selecting a target virtual machine according to the user identifier and the application identifier that are carried in the second connection request; and recovering, by the virtual management server, an application with an exception on the target virtual machine.

The determining that an application indicated by the second connection request requires exception recovery specifically includes:

determining, by the virtual management server, that data to be recovered which corresponds to the application identifier and the user identifier is stored in the data storage server.

The receiving, by the virtual management server, an exception recovery request of the second client, and selecting a target virtual machine according to the user identifier and the application identifier that are carried in the second connection request specifically include:

obtaining, by the virtual management server from the data storage server, data to be recovered which corresponds to the application identifier and the user identifier;

when the data to be recovered is the data of the virtual machine, selecting, by the virtual management server, the target virtual machine according to the data of the virtual machine; or when the data to be recovered is the application data, selecting, by the virtual management server, the target virtual machine according to the application identifier.

When the data to be recovered is the data of the virtual machine, the data to be recovered includes the snapshot data of the virtual machine, virtual machine information, and virtual machine identifier; and the selecting, by the virtual management server, the target virtual machine according to the data of the virtual machine specifically includes:

determining, by the virtual management server, whether a virtual machine corresponding to the virtual machine identifier is idle; and when determining that the virtual machine corresponding to the virtual machine identifier is idle, using the virtual machine corresponding to the virtual machine identifier as the target virtual machine; or when determining that the virtual machine corresponding to the virtual machine identifier is not idle, selecting an idle virtual machine matching the virtual machine information as the target virtual machine.

The selecting, by the virtual management server, the target virtual machine according to the application identifier specifically includes:

when the data to be recovered is the application data, selecting a first virtual machine from idle virtual machines as the target virtual machine according to the application identifier, where the first virtual machine is a virtual machine that supports running of the application indicated by the application identifier.

The recovering, by the virtual management server, an application with an exception on the target virtual machine specifically includes:

when the data to be recovered is the data of the virtual machine, starting the target virtual machine according to the snapshot data of the virtual machine in the data of the virtual machine to directly recover the application with an exception; or when the data to be recovered is the application data, starting the virtual machine, copying the application data to the target virtual machine, and running, according to the application data, the application with an exception on the target virtual machine.

After the recovering, by the virtual management server, an application with an exception on the target virtual machine, the method further includes:

sending, by the virtual management server, the virtual machine identifier to a client, so that the client establishes a communication connection with the virtual machine according to the virtual machine identifier and performs data interaction with the virtual machine.

An exception handling apparatus includes:

a receiving module, configured to receive an exception notification sent by a virtual machine that interacts with a first client, where the exception notification at least carries a user identifier and an application identifier; and an exception handling module, configured to store, according to a stored exception handling mode corresponding to the user identifier and the application identifier, data of the virtual machine or application data of an application corresponding to the application identifier, and release resources of the virtual machine.

The receiving module is further configured to receive a first connection request sent by the first client, where the first connection request at least carries the user identifier and the application identifier; and the apparatus further includes:

a determining module, configured to determine and store, according to the first connection request, the exception handling mode corresponding to the user identifier and the application identifier.

The determining module includes:

a first determining unit, configured to: when the first connection request carries the application identifier and the user identifier, obtain, according to the application identifier, a list of exception handling modes that is supported by the application; send the list of exception handling modes to the first client, so that the first client selects an exception handling mode from the list of exception handling modes; and determine and store the exception handling mode selected by the first client as the exception handling mode corresponding to the user identifier and the application identifier; or a second determining unit, configured to: when the first connection request carries the application identifier, the user identifier, and a specified exception handling mode, obtain, according to the application identifier, a list of exception handling modes that is supported by the application, and determine whether the list of exception handling modes includes the specified exception handling mode; and when determining that the list of exception handling modes includes the specified exception handling mode, determine and store the specified exception handling mode as the exception handling mode corresponding to the user identifier and the application identifier; or when determining that the list of exception handling modes does not include the specified exception handling mode, send the list of exception handling modes to the first client, receive an exception handling mode selected by the first client from the list of exception handling modes, and determine and store the exception handling mode selected by the first client as the exception handling mode corresponding to the user identifier and the application identifier; where the second determining unit is further configured to: when the first connection request carries the application identifier, the user identifier, and a specified exception handling mode, determine and store the specified exception handling mode as the exception handling mode corresponding to the user identifier and the application identifier.

The exception handling module includes:

a first exception handling unit, configured to: when the exception handling mode corresponding to the user identifier and the application identifier is an application storage mode, determine, according to preset logic of the application, that running data of the application needs to be stored, obtain, from the virtual machine according to a configuration file of the application, user personal data indicated by the configuration file, store the user personal data, the application identifier, and the user identifier to a data storage server, quit the application, release the resources of the virtual machine, and update a state of the virtual machine; and a second exception handling unit, configured to: when the exception handling mode corresponding to the user identifier and the application identifier is a virtual machine state storage mode, generate snapshot data of the virtual machine according to a current state of the virtual machine, store the generated snapshot data of the virtual machine, the application identifier, virtual machine information, a virtual machine identifier, and the user identifier to the data storage server, release the resources of the virtual machine, and update the state of the virtual machine.

The receiving module is further configured to receive a second connection request sent by a second client, where the second connection request carries the user identifier and the application identifier;

the apparatus further includes:

an exception recovery determining module, configured to determine, according to the second connection request, that an application indicated by the second connection request requires exception recovery;

a sending module, configured to send an exception recovery query message to the second client;

a virtual machine selecting module, configured to select, when an exception recovery request of the second client is received, a target virtual machine according to the user identifier and the application identifier that are carried in the second connection request; and a recovering module, configured to recover an application with an exception on the target virtual machine.

The exception recovery determining module is specifically configured to determine that data to be recovered which corresponds to the application identifier and the user identifier is stored in the data storage server.

The virtual machine selecting module includes:

an obtaining unit, configured to obtain, from the data storage server, data to be recovered which corresponds to the application identifier and the user identifier; and a selecting unit, configured to: when the data to be recovered is the data of the virtual machine, select the target virtual machine according to the data of the virtual machine; where the selecting unit is further configured to: when the data to be recovered is the application data, select the target virtual machine according to the application identifier.

When the data to be recovered is the data of the virtual machine, the data to be recovered includes the snapshot data of the virtual machine, virtual machine information, and virtual machine identifier; and the selecting unit is specifically configured to determine whether a virtual machine corresponding to the virtual machine identifier is idle, and when determining that the virtual machine corresponding to the virtual machine identifier is idle, use the virtual machine corresponding to the virtual machine identifier as the target virtual machine; and the selecting unit is further configured to: when determining that the virtual machine corresponding to the virtual machine identifier is not idle, select an idle virtual machine matching the virtual machine information as the target virtual machine.

The selecting unit is further configured to: when the data to be recovered is the application data, select a first virtual machine from idle virtual machines as the target virtual machine according to the application identifier, where the first virtual machine is a virtual machine that supports running of the application indicated by the application identifier.

The recovering module includes:

a first recovering unit, configured to: when the data to be recovered is the data of the virtual machine, start the target virtual machine according to the snapshot data of the virtual machine in the data of the virtual machine to directly recover an application with an exception; and a second recovering unit, configured to: when the data to be recovered is the application data, start the virtual machine, copy the application data to the target virtual machine, and run, according to the application data, the application with an exception on the target virtual machine.

The sending module is further configured to send the virtual machine identifier to a client, so that the client establishes a communication connection with the virtual machine according to the virtual machine identifier and performs data interaction with the virtual machine.

An exception recovery method includes:

sending, by a client, a connection request to a virtual management server, where the connection request at least carries a user identifier and an application identifier;

receiving, by the client, a list of exception handling modes that is sent by the virtual management server and corresponding to the application identifier; and sending, by the client, an exception handling mode selected by the client to the virtual management server, so that the virtual management server determines and stores the exception handling mode selected by the client as an exception handling mode corresponding to the application identifier and the user identifier.

The connection request carries the user identifier, the application identifier, and a specified exception handling mode; and the receiving, by the client, a list of exception handling modes that is sent by the virtual management server and corresponding to the application identifier specifically includes:

when the virtual management server determines that the list of exception handling modes does not include the specified exception handling mode, receiving, by the client, the list of exception handling modes that is sent by the virtual management server.

The method further includes:

receiving, by the client, an exception recovery query message sent by the virtual management server, and sending an exception recovery request or exception recovery reject message to the virtual management server, so that the virtual management server performs a corresponding operation according to the exception recovery request or exception recovery reject message.

A client includes:

a sending module, configured to send a connection request to a virtual management server, where the connection request at least carries a user identifier and an application identifier;

a receiving module, configured to receive a list of exception handling modes that is sent by the virtual management server and corresponding to the application identifier; where the sending module is further configured to send an exception handling mode selected by the client to the virtual management server, so that the virtual management server determines the exception handling mode selected by the client as an exception handling mode corresponding to the application identifier and the user identifier.

The connection request carries the user identifier, the application identifier, and a specified exception handling mode; and the receiving module is specifically configured to: when the virtual management server determines that the list of exception handling modes does not include the specified exception handling mode, receive the list of exception handling modes that is sent by the virtual management server.

The sending module is further configured to send an exception recovery request or exception recovery reject message to the virtual management server when the receiving module receives an exception recovery query message sent by the virtual management server, so that the virtual management server performs a corresponding operation according to the exception recovery request or exception recovery reject message.

The technical solutions of the embodiments of the present invention have the following beneficial effects:

when a client and a virtual machine interacting with the client are exceptionally interrupted, a virtual management server receives an exception notification indicating an exceptional interruption, stores application data or data of the virtual machine according to an exception handling mode corresponding to the client, and releases resources of the virtual machine. Therefore, different exception handling methods can be customized for different applications and different users according to requirements, the client can also store a usage state of a user at exception occurrence time or at the time nearest to the exception occurrence time, and the capacity and efficiency of an online application system are improved.

BRIEF DESCRIPTION OF DRAWINGS

To illustrate the technical solutions in the embodiments of the present invention more clearly, the following briefly introduces the accompanying drawings required for describing the embodiments. The accompanying drawings and the following description show merely some embodiments of the present invention, and a person of ordinary skill in the art may still derive other drawings from these accompanying drawings without creative efforts.

FIG. 1 is an architecture diagram of an online application system according to an embodiment of the present invention;

FIG. 2 is a flowchart of an exception handling method according to an embodiment of the present invention;

DETAILED DESCRIPTION

Figure 3A:
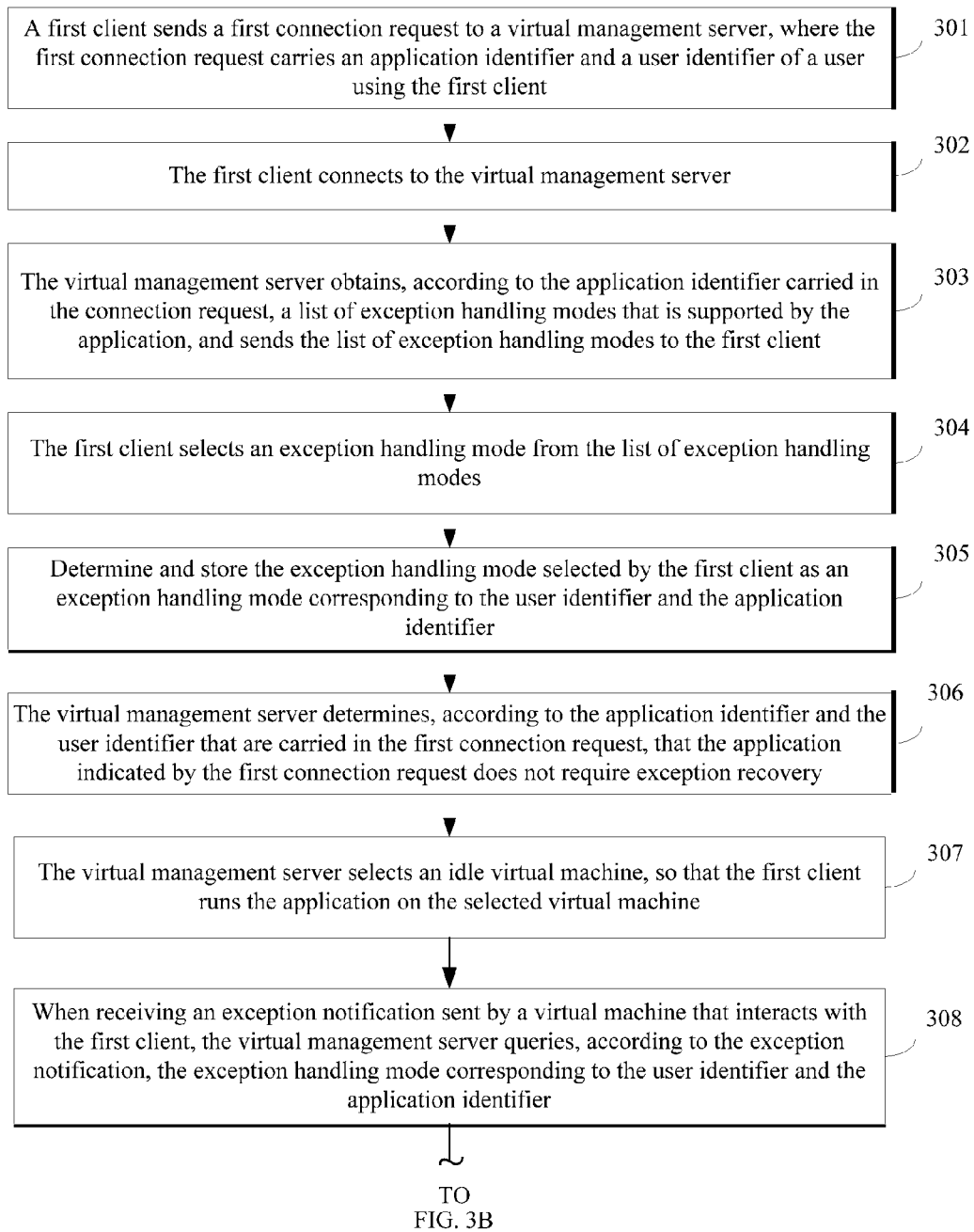
FIG. 3A and FIG. 3B are a flowchart of an exception handling method according to an embodiment of the present invention.

To make the objectives, technical solutions, and advantages of the present invention more comprehensible, the following further describes the embodiments of the present invention in detail with reference to the accompanying drawings.

For ease of understanding, before describing the exception handling method provided by the present invention, the following first describes some underlying principles involved in embodiments of the present invention.

Applications may be classified, according to preset logic of the applications, into applications requiring storage of running data and applications not requiring storage of running data. For an application not requiring storage of running data, resources of a virtual machine are released directly after the application is exited; and when a user connects next time, the application runs from the beginning. For an application requiring storage of running data, the application is exited first, and then resources of a virtual machine are released after user personal running data is stored to a running data storage server. Though an online application platform also provides various applications, the online application platform mainly provides game applications. Therefore, in the following description, a game is directly used as an example of an application. Game applications may be classified into the following types according to whether running data is stored: applications not requiring storage of running data and applications requiring storage of running data. Typical examples of applications not requiring storage of running data are various flash games; a user plays a game from the beginning every time, not requiring storage of running data, for example, "Gold Miner", "Block Breaker", and so on.

FIG. 1 is an architecture diagram of an online application system according to an embodiment of the present invention. Referring to FIG. 1, the online application system includes: a virtual management server, a virtual machine, and a data storage server. The virtual management server is configured to manage the virtual machine, including creation, deletion, and startup of the virtual machine. The virtual machine is configured to allocate different system resources according to different service requirements, install different operating systems and application software, and provide services for a remote client.

FIG. 2 is a flowchart of an exception handling method according to an embodiment of the present invention. The method is based on the architecture shown in FIG. 1, and its executor is a virtual management server. Referring to FIG. 2, this embodiment specifically includes the following:

At step 201, a virtual management server receives an exception notification sent by a virtual machine that interacts with a first client, where the exception notification at least carries a user identifier and an application identifier.

In this embodiment, the first client is a client for an online application.

In this embodiment, when the first client is disconnected because a connection between the first client and the virtual machine is disconnected or because a connection exception occurs, the virtual machine sends the exception notification to the virtual management server. The exception notification carries a user identifier of a user using the first client and an application identifier of an application with an exception.

At step 202, the virtual management server stores, according to a stored exception handling mode corresponding to the user identifier and the application identifier, data of the virtual machine or application data of an application corresponding to the application identifier, and releases resources of the virtual machine.

It should be noted that, the exception handling mode corresponding to the user identifier and the application identifier may be determined when the client connects to the virtual management server for the first time and uses the application corresponding to the application identifier for the first time, or may be determined every time when the client connects to the virtual management server.

When receiving the exception notification, the virtual management server queries the exception handling mode corresponding to the user identifier and the application identifier according to the user identifier and the application identifier. And when the exception handling mode is an application storage mode, the virtual management server determines, according to preset logic of the application, whether application data needs to be stored; when the application data needs to be stored, the virtual management server obtains, from the virtual machine according to a configuration file of the application, user personal data indicated by the configuration file, stores the user personal data, the application identifier, and the user identifier to a data storage server, quits the application, releases the resources of the virtual machine, and updates a state of the virtual machine, so that the resources are subsequently allocated by the virtual management server. When the exception handling mode corresponding to the user identifier is a virtual machine state storage mode, the virtual management server generates snapshot data of the virtual machine according to a current state of the virtual machine, stores the generated snapshot data of the virtual machine, the application identifier, virtual machine information, a virtual machine identifier, and the user identifier to the data storage server, releases the resources of the virtual machine, and updates the state of the virtual machine. Because a server of an online application platform uses a virtual machine technology, a snapshot technology in the virtual machine may be used to store the state of the virtual machine in real time. A snapshot is a "copy" of the virtual machine at a time point, where the "copy" is not a copy of a virtual disk file of the virtual machine, but maintains a state of the virtual disk file and system memory at the time point, so that the virtual machine can recover at any time to the time point.

When a connection between a client and a virtual machine interacting with the client is exceptionally interrupted, a virtual management server receives an exception notification indicating an exceptional interruption, stores application data or data of the virtual machine according to an exception handling mode corresponding to the application identifier and the user identifier, and releases resources of the virtual machine. Therefore, different exception handling methods can be customized for different applications and different users according to requirements, the client can also store a usage state of a user at exception occurrence time or at the time nearest to the exception occurrence time, and the capacity and efficiency of an online application system are improved.

Figure 3B:
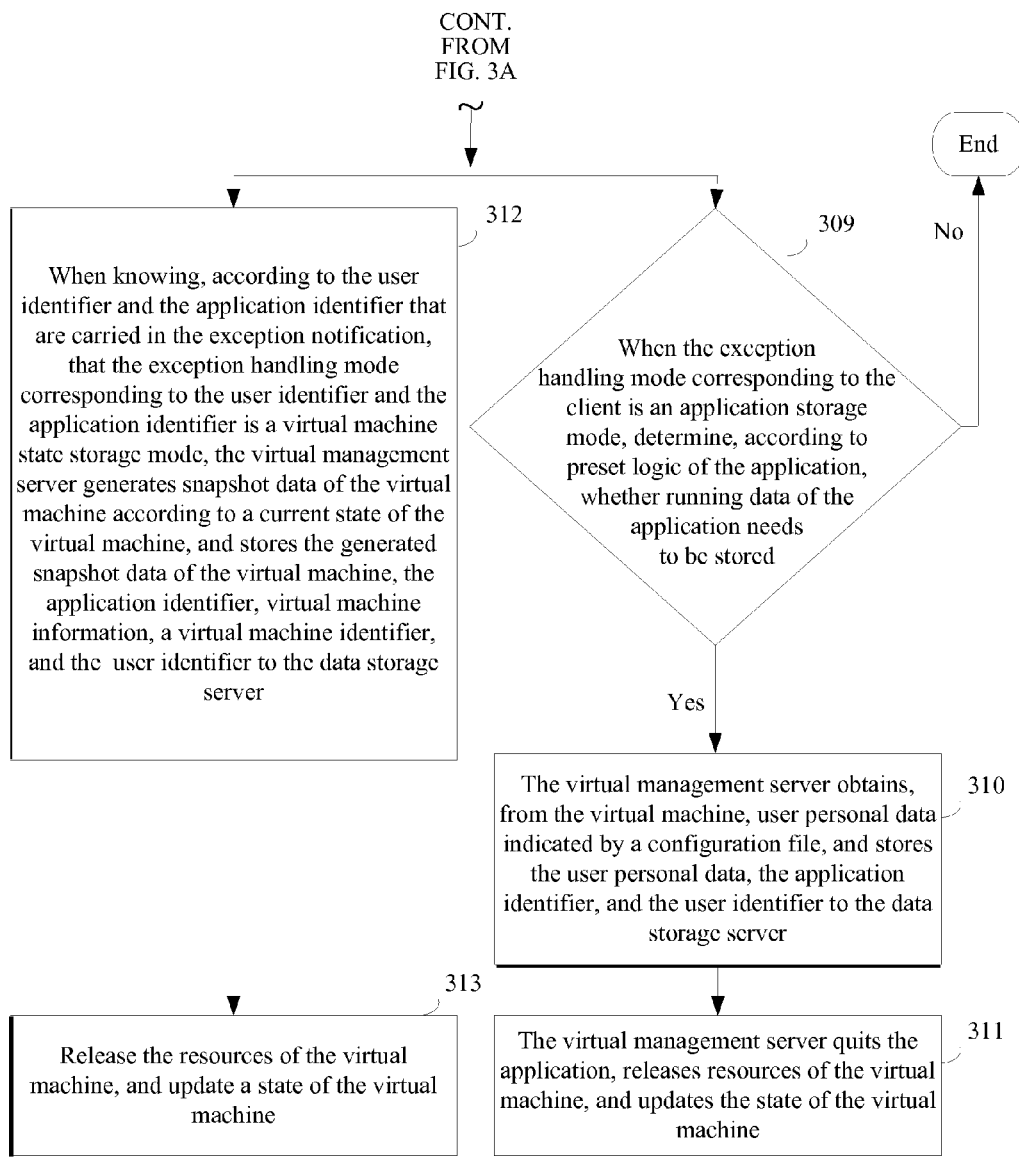

FIG. 3A and FIG. 3B are a flowchart of an exception handling method according to an embodiment of the present invention. The method is based on the architecture shown in FIG. 1. Two interacting parties in this embodiment are a virtual management server and a first client. Referring to FIG. 3A and FIG. 3B, this embodiment specifically includes the following:

At step 301, a first client sends a first connection request to a virtual management server, where the first connection request carries an application identifier and a user identifier of a user using the first client.

The first connection request at least carries the application identifier and the user identifier, where the application identifier indicates an application that the first client will use remotely, and the user identifier indicates the user using the first client.

At step 302, the first client connects to the virtual management server.

A person skilled in the art may know that, step 302 includes a process of establishing a connection, performing security authentication, and performing capability negotiation, by the first client with the virtual management server, which pertains to the prior art and is not further described.

At step 303, the virtual management server obtains, according to the application identifier carried in the connection request, a list of exception handling modes that is supported by the application, and sends the list of exception handling modes to the first client.

In this embodiment, the list of exception handling modes that is supported by the application is pre-stored in a configuration file of the application; the virtual management server may read, according to the application identifier, the configuration file of an application corresponding to the application identifier, thereby obtains the list of exception handling modes that are supported by the application. The list may include multiple exception handling modes, for example, an application storage mode, a virtual machine state storage mode, an application non-storage mode, and so on. The application non-storage mode means not storing the application.

Before executing this step, the virtual management server may further determine whether the exception handling mode corresponding to the user identifier and the application identifier that are carried in the first connection request is stored, and when determining the exception handling mode corresponding to the user identifier and the application identifier that are carried in the first connection request is stored, the virtual management server does not execute a subsequent step of determining the exception handling mode through negotiation. The subsequent step of determining the exception handling mode through negotiation is performed only when the exception handling mode corresponding to the user identifier and the application identifier that are carried in the first connection request is not stored.

At step 304, the first client selects an exception handling mode from the list of exception handling modes.

The exception handling mode may be further selected according to a capability of the client or setting of the client; according to different capabilities and settings of clients, different clients may select different exception handling modes from the list of exception handling modes.

In this embodiment, the exception handling mode may be the application storage mode or virtual machine state storage mode.

The application storage modes is: first quitting the application program, and then releasing resources of the virtual machine after storing user personal data, the application identifier, and the user identifier to a data storage server.

The virtual machine state storage mode is: generating snapshot data of the virtual machine, storing the generated snapshot data of the virtual machine, the application identifier, virtual machine information, a virtual machine identifier, and the user identifier to the data storage server, and releasing the resources of the virtual machine, so that when the user reconnects next time, recovers, according to the snapshot data, to a time when the user is disconnected. For example, the virtual machine generates snapshot data of the virtual machine in the running process of the application, and may restart the virtual machine according to a snapshot file at any time. If the virtual machine runs the application again, the running time of the application may be the time of generating the snapshot data of the virtual machine.

At step 305, the method determines and stores the exception handling mode selected by the first client as the exception handling mode corresponding to the user identifier and the application identifier.

Steps 303-305 are a process of negotiation about the exception handling mode between the first client and the virtual management server. It should be noted that, in the process of determining an exception handling mode through interaction, one or more exception handling modes may be determined, and when multiple exception handling modes are determined, priorities of the multiple exception handling modes are determined. For example, a priority of the application storage mode is set to the highest, and a priority of the virtual machine state storage mode is set to the second highest, when an exception occurs, the first client and virtual management server preferentially use the application storage mode to store a running state of the application.

In another solution, when the client has a specified exception handling mode, the connection request sent by the client to the virtual management server carries the application identifier, the user identifier, and a specified exception handling mode. The specified exception handling mode may be an exception handling mode set by the client at this time or a default exception handling mode of the client. In this case, step 303 is specifically as follows: The virtual management server receives the first connection request, and steps 304 and 305 may be replaced by the following content: The virtual management server obtains, according to the application identifier, a list of exception handling modes that is supported by the application, and determines whether the list of exception handling modes includes the specified exception handling mode; and when determining that the list of exception handling modes includes the specified exception handling mode, the virtual management server determines and stores the specified exception handling mode as the exception handling mode corresponding to the user identifier for the connection; or when determining that the list of exception handling modes does not includes the specified exception handling mode, the virtual management server sends the list of exception handling modes to the first client, receives an exception handling mode selected by the first client from the list of exception handling modes, and determines and stores the exception handling mode selected by the first client as the exception handling mode corresponding to the user identifier. In this solution, a process of determining the specified exception handling mode is executed. However, in a more simplified solution, when the first connection request carries the application identifier, the user identifier, and the specified exception handling mode, step 303 is specifically as follows: The virtual management server receives the first connection request, and steps 304 and 305 may be replaced by the following content: The virtual management server determines and stores the specified exception handling mode as the exception handling mode corresponding to the user identifier and the application identifier. In the simplified solution, the specified exception handling mode is used as the exception handling mode corresponding to the user identifier for the connection, and the specified exception handling mode is used for exception handling when a subsequent exception occurs.

At step 306, the virtual management server determines, according to the application identifier and the user identifier that are carried in the first connection request, that the application indicated by the first connection request does not require exception recovery.

The virtual management server determines that the data storage server does not store data to be recovered which corresponds to the application identifier and the user identifier, and therefore determines that the application indicated by the first connection request does not require exception recovery.

This embodiment is described by using only an example where the application indicated by the first connection request does not require exception recovery.

When the virtual management server executes step 306, steps 303 to 305 may be not executed first; instead, the virtual management server directly determines whether the exception handling mode corresponding to the user identifier and the application identifier that are carried in the first connection request is stored and whether exception recovery is required.

At step 307, the virtual management server selects an idle virtual machine, so that the first client runs the application on the selected virtual machine.

In this embodiment, a virtual machine that can support the application corresponding to the application identifier is selected from idle virtual machines according to the application identifier, so that the first client runs the application on the selected virtual machine.

Specifically, the virtual management server selects, from the idle virtual machines according to the application identifier, an idle virtual machine that can support the application. The virtual management server updates the corresponding state of the virtual machine, and sends the application identifier to the virtual machine, so that the virtual machine starts the application corresponding to the application identifier and sends an address of the virtual machine to the first client. Therefore, the first client establishes a communication channel with the virtual machine according to the address of the virtual machine that is sent by the virtual management server. The virtual machine sends audio and video data to the first client to present the running of the application, and the first client uploads a control instruction to control the running of the application. The process of establishing a connection and running pertains to the prior art, and is not further described in the present invention.

At step 308, when receiving an exception notification sent by a virtual machine that interacts with the first client, the virtual management server queries, according to the exception notification, the exception handling mode corresponding to the user identifier and the application identifier.

After determining the exception handling mode corresponding to the user identifier and the application identifier, the virtual management server correspondingly stores the user identifier, the application identifier, and exception handling mode. Therefore, in this step, when an exception occurs, the virtual management server finds, according to a user identifier and an application identifier that are involved in the exception, the exception handling mode corresponding to the user identifier and the application identifier.

At step 309, when knowing, according to the user identifier and the application identifier that are carried in the exception notification, that the exception handling mode corresponding to the user identifier and the application identifier is an application storage mode, the virtual management server determines, according to preset logic of the application, whether running data of the application needs to be stored.

When determining the running data of the application needs to be stored, the step goes to step 310.

If determining the running data of the application does not need to be stored not, the process ends.

This embodiment is described by using only an example where the running data of the application needs to be stored.

The virtual management server knows the preset logic of the application by reading the configuration file of the application, and may know, according to the preset logic of the application, whether an application with an exception is an application whose running data needs to be stored.

At step 310, the virtual management server obtains, from the virtual machine, user personal data indicated by a configuration file, and stores the user personal data, the application identifier, and the user identifier to a data storage server.

In this embodiment, the virtual management server may know a storage path and file name of the user personal data in the application by reading the configuration file of the application, obtain the user personal data from the virtual machine according to the known storage path and file name, and store the user personal data, the application identifier, and the user identifier to the data storage server.

At step 311, the virtual management server quits the application, releases resources of the virtual machine, and updates the state of the virtual machine; the process ends.

The process of step 309 to step 311 is a process of storing, by the virtual management server according to the application storage mode, the running data of application on the virtual machine, and releasing the resources of the virtual machine.

At step 312, when knowing, according to the user identifier and the application identifier that are carried in the exception notification, that the exception handling mode corresponding to the user identifier and the application identifier is a virtual machine state storage mode, the virtual management server generates snapshot data of the virtual machine according to a current state of the virtual machine, and stores the generated snapshot data of the virtual machine, the application identifier, virtual machine information, a virtual machine identifier, and the user identifier to the data storage server.

In this embodiment, the virtual management server stores the generated snapshot data of the virtual machine, the application identifier, virtual machine information, virtual machine identifier, and user identifier to the data storage server, and stores the storage path on the data storage server to a user information table, where the user information table records personal related information of the user.

The virtual machine information includes related performance of the virtual machine, for example, a memory size, CPU information, hard disk information, and so on.

At step 313, releases the resources of the virtual machine, and updates a state of the virtual machine.

The process of step 312 and step 313 is a process of storing, by the virtual management server, according to the virtual machine state storage mode, the snapshot data of the virtual machine, and releasing the resources of the virtual machine.

By using the method provided by this embodiment, when a client and a virtual machine interacting with the client are exceptionally interrupted, a virtual management server receives an exception notification indicating an exceptional interruption, stores application data or data of the virtual machine according to an exception handling mode corresponding to the client, and releases resources of the virtual machine. Therefore, different exception handling methods can be customized for different applications and different users according to requirements, the client can also store a usage state of a user at exception occurrence time or at the time nearest to the exception occurrence time, and the capacity and efficiency of an online application system are improved while long-time occupancy of resources of the virtual machine is avoided.

Figure 4A:
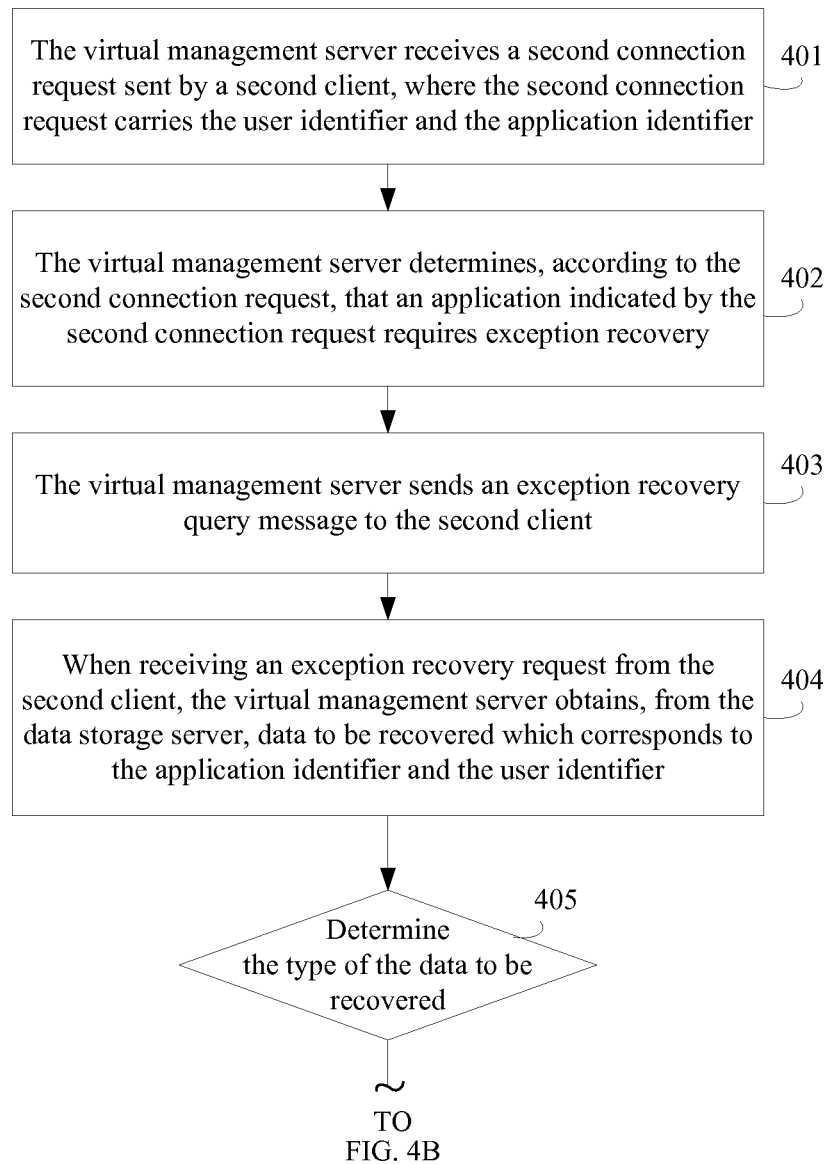
FIG. 4A and FIG. 4B are a flowchart of an exception handling method according to an embodiment of the present invention.
Figure 4B:
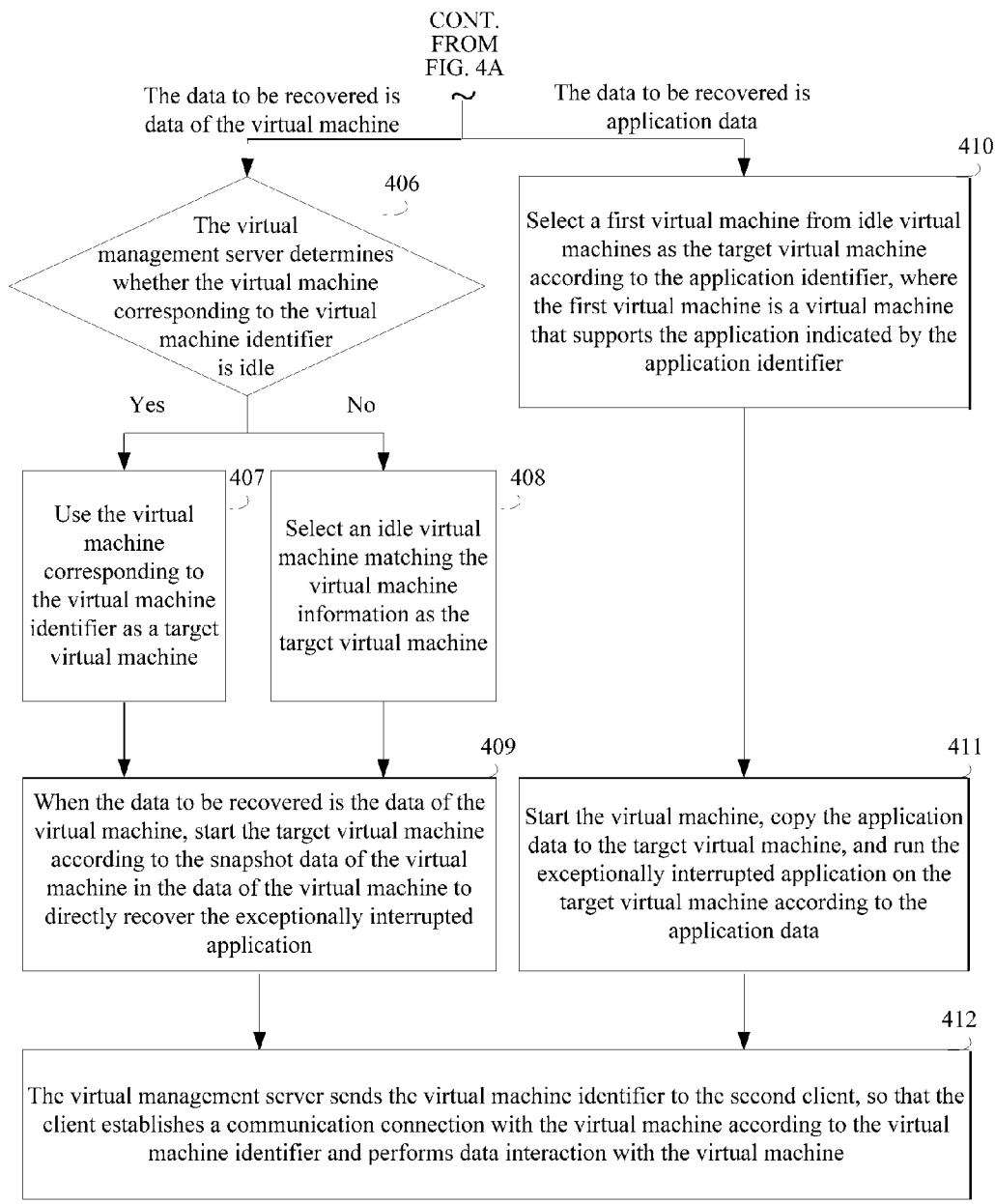

FIG. 4A and FIG. 4B are a flowchart of an exception handling method according to an embodiment of the present invention. This embodiment is based on the embodiment shown in FIG. 3A and FIG. 3B. In the embodiment shown in FIG. 3A and FIG. 3B, according to the first connection request, an application runs on the virtual machine; when an exception occurs in the application, the virtual management server stores data of the virtual machine or application data according to the exception handling mode determined through negotiation. Subsequently, the method in FIG. 4A and FIG. 4B includes the following:

At step 401, the virtual management server receives a second connection request sent by a second client, where the second connection request carries the user identifier and the application identifier.

It should be noted that, the second client may be a client where the exception occurs, namely, the first client, or may be another client. The user may not use the first client to connect for this time, but connect from the second client.

At step 402, the virtual management server determines, according to the second connection request, that an application indicated by the second connection request requires exception recovery.

The virtual management server determines that the data storage server stores the data to be recovered which corresponds to the application identifier and the user identifier, and therefore determines that the application indicated by the second connection request requires exception recovery.

Specifically, the virtual management server determines, according to the user identifier in the second connection request, whether the data storage server stores data corresponding to the user identifier, and when determines that the data storage server stores the data corresponding to the user identifier, determines, according to the application identifier and the data, whether the data to be recovered which corresponds to the application identifier exists; and when the data to be recovered which corresponds to the application identifier exists in the data, the application indicated by the second connection request requires exception recovery.

In another solution, after the second client connects, the virtual management server determines, according to the user identifier, that the data storage server stores data corresponding to the user identifier, and then determines, according to the application identifier and the data, that the data is not the data to be recovered which corresponds to the application identifier, but is data to be recovered of another application. In this case, the virtual management server may notify the second client of the previous connection exception, and the second client may select to resume the previous exceptional application, or may give up the previous application and continue to select the application used at this time.

At step 403, the virtual management server sends an exception recovery query message to the second client.

Preferably, the exception recovery query message carries the application identifier and the user identifier.

The exception recovery query message is used to notify the second client that the application was exceptionally interrupted, and that the data storage server stores the data to be recovered which was stored when the exceptional interruption caused, so that the second client selects whether to recover the data when an exceptional interruption caused.

It should be noted that, in this embodiment, whether the data stored when the exceptional interruption occurs may be recovered is determined based on the user identifier and the application identifier.

This embodiment is described by using only an example where the application indicated by the application identifier and the user identifier requires exception recovery.

At step 404, when receiving an exception recovery request from the second client, the virtual management server obtains, from the data storage server, data to be recovered which corresponds to the application identifier and the user identifier.

The exception recovery request carries the user identifier and the application identifier. Specifically, the exception recovery request may have a flag bit indicating the second client which agrees to exception recovery.

In this embodiment, the second client sends the exception recovery request, where the exception recovery request is used to instruct the virtual management server to recover an application with an exception according to the data to be recovered which is stored on the data storage server.

The data to be recovered may be data of the virtual machine or application data. The data of the virtual machine is stored when the virtual management server performs exception handling according to the virtual machine state storage mode when receiving the exception notification, and the data of the virtual machine specifically includes: the snapshot data of the virtual machine generated when the exception occurs, the application identifier, virtual machine information, virtual machine identifier, and user identifier. The application data is stored when the virtual management server performs exception handling according to the application storage mode when receiving the exception notification, and the application data specifically includes: the user personal data indicated by the configuration file of the application, user personal data, the application identifier, the and user identifier.

At step 405, the method determines the type of the data to be recovered.

When the data to be recovered is the data of the virtual machine, the step goes to step 406.

When the data to be recovered is the application data, the step goes to step 410.

Specifically, the determining the type of the data to be recovered includes determining whether the data to be recovered includes the virtual machine information; when the data to be recovered includes the virtual machine information, the data to be recovered is the data of the virtual machine; and when the data to be recovered does not include virtual machine information, the data to be recovered is the application data.

At step 406, when the data to be recovered is data of the virtual machine, the data of the virtual machine includes at least a snapshot data file of the virtual machine, the virtual machine information, and the virtual machine identifier; and the virtual management server determines whether a virtual machine corresponding to the virtual machine identifier is idle.

When determining that the virtual machine corresponding to the virtual machine identifier is idle, the step goes to step 407.

When determining that the virtual machine corresponding to the virtual machine identifier is not idle, the step goes to step 408.

In this embodiment, to ensure an optimal running environment, the corresponding virtual machine is queried according to the virtual machine identifier; when the virtual machine corresponding to the virtual machine identifier is idle, the virtual machine corresponding to the virtual machine identifier is preferentially selected as a target virtual machine; when the virtual machine corresponding to the virtual machine identifier is not idle, a virtual machine matching the virtual machine information is further queried according to the virtual machine information and is used as a target virtual machine. The matching means that related performance of the virtual machine and the virtual machine information are the same, for example, a memory size, CPU information, hard disk information, and so on.

At step 407, the method uses the virtual machine corresponding to the virtual machine identifier as a target virtual machine and executes step 409.

At step 408, the, method selects an idle virtual machine matching the virtual machine information as the target virtual machine and executes step 407.

At step 409, when the data to be recovered is the data of the virtual machine, start the target virtual machine according to the snapshot data of the virtual machine in the data of the virtual machine to directly recover the application with an exception. and skip to step 412.

In this embodiment, the data of the virtual machine includes snapshot data information of the virtual machine; and the target virtual machine is started according to the snapshot data information of the virtual machine. The application and virtual machine may be recovered to a scenario where the exception occurs.

At step 410, the method selects a first virtual machine from idle virtual machines as the target virtual machine according to the application identifier, where the first virtual machine is a virtual machine that supports the application indicated by the application identifier.

For the virtual machine, due to different platforms or systems, applications supported by each virtual machine are different. Therefore, it is necessary to match the virtual machine according to the application identifier to obtain the virtual machine that supports the application indicated by the application identifier.

At step 411, the method starts the virtual machine, copies the application data to the target virtual machine, and runs the application with an exception on the target virtual machine according to the application data.

It should be noted that, when the virtual machine does not have the application, the application is first installed, and the user personal data is copied, and then the application is started.

Specifically, the virtual management server copies the user identifier and application data that are corresponding to the application identifier to a directory corresponding to the application of the target virtual machine. It should be noted that, the application data is data already stored when the virtual machine runs normally before occurrence of the exception, where the storage is performed at a preset duration. Therefore, when exception recovery is performed according to the application data, the recovered data is not necessarily the running data of the application when the exception occurs. For example, the preset interval of an application for automatic incremental storage is 30 minutes, and therefore the virtual machine that runs the application stores the user personal data at an interval of 30 minutes. Assuming that an exception occurs at the $15^{th}$ minute after the $N^{th}$ time of storage, the application data stored during the exception is the user personal data, the user identifier, and the application identifier that are stored at the previous N times of storage.

At step 412, the virtual management server sends the virtual machine identifier to the second client, so that the client establishes a communication connection with the virtual machine according to the virtual machine identifier and performs data interaction with the virtual machine. The process ends.

The process of establishing a connection with the second client pertains to the prior art, and is not further described herein.

The second client receives the audio and video data delivered by the server, receives a running state of the application on the virtual machine in real time, and uploads a control instruction used to control running of the application on the virtual machine. In the above interaction process, an input event of a user operation may be specifically a keyboard and mouse event (a client of a PC model), a keystroke or touch screen event (a client of a mobile phone or PDA model), an operation event of a remote control or game handle (a client of a TV model), and so on; a generally used mode of sending a picture by the server and receiving and displaying the picture by the client is as follows: The server performs high-efficient compression (for example, using a video compression technology) on the audio and video data and sends the audio and video data to the client, and the client decodes and displays the picture after receiving the compressed picture.

When a client and a virtual machine interacting with the client are exceptionally interrupted, a virtual management server receives an exception notification indicating an exceptional interruption, stores application data or data of the virtual machine according to an exception handling mode corresponding to the client, and releases resources of the virtual machine. Therefore, different exception handling methods can be customized for different applications and different users according to requirements, the client can also store a usage state of a user at exception occurrence time or at the time nearest to the exception occurrence time, and the capacity and efficiency of the online application system are improved while long-time occupancy of resources of the virtual machine is avoided. Further, when it is necessary to perform recovery according to the stored data, the client may determine an exception recovery mode according to the type of the data to be recovered. Therefore the client can continue running the application from the exception occurrence time or the time nearest to the exception occurrence time, and the user experience is improved.

Figure 5:
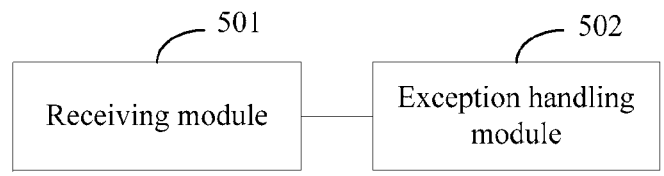
FIG. 5 is a schematic structural diagram of an exception handling apparatus according to an embodiment of the present invention.

FIG. 5 is a schematic structural diagram of an exception handling apparatus according to an embodiment of the present invention. The apparatus includes:

a receiving module 501, configured to receive an exception notification sent by a virtual machine that interacts with a first client, where the exception notification at least carries a user identifier and an application identifier; and an exception handling module 502, configured to store, according to a stored exception handling mode corresponding to the user identifier and the application identifier, data of the virtual machine or application data of an application corresponding to the application identifier, and release resources of the virtual machine.

Figure 6:
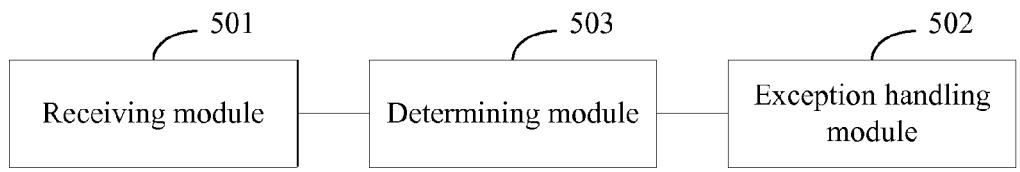
FIG. 6 is a schematic structural diagram of an exception handling apparatus according to an embodiment of the present invention.

FIG. 6 is a schematic structural diagram of an exception handling apparatus according to an embodiment of the present invention. The apparatus includes a receiving module 501 and an exception handling module 502.

The receiving module 501 is further configured to receive a first connection request sent by the first client, where the first connection request at least carries the user identifier and the application identifier; and the apparatus further includes:

a determining module 503, configured to determine and store, according to the first connection request, the exception handling mode corresponding to the user identifier and the application identifier.

Figure 7:
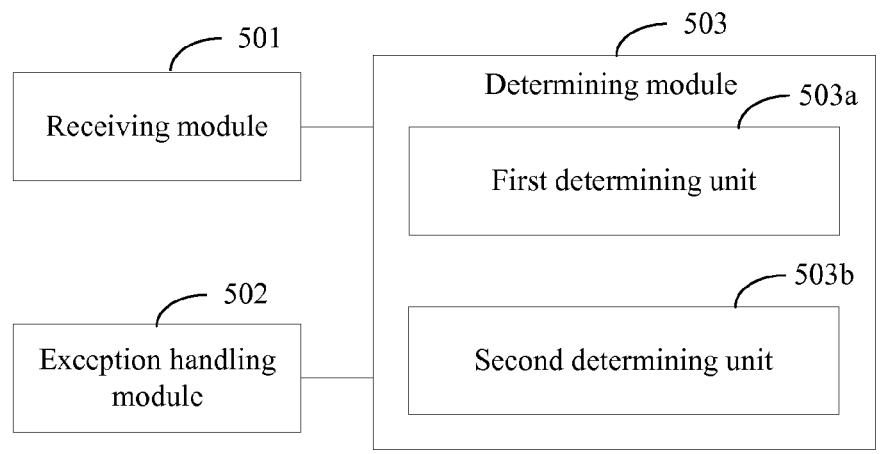
FIG. 7 is a schematic structural diagram of an exception handling apparatus according to an embodiment of the present invention.

FIG. 7 is a schematic structural diagram of an exception handling apparatus according to an embodiment of the present invention. The apparatus includes a receiving module 501, an exception handling module 502, and a determining module 503.

The determining module 503 includes:

a first determining unit 503a, configured to: when the first connection request carries the application identifier and the user identifier, obtain, according to the application identifier, a list of exception handling modes that is supported by the application; send the list of exception handling modes to the first client, so that the first client selects an exception handling mode from the list of exception handling modes; and determine and store the exception handling mode selected by the first client as the exception handling mode corresponding to the user identifier and the application identifier; or a second determining unit 503b, configured to: when the first connection request carries the application identifier, the user identifier, and a specified exception handling mode, obtain, according to the application identifier, a list of exception handling modes that is supported by the application, and determines whether the list of exception handling modes includes the specified exception handling mode; and when determines that the list of exception handling modes includes the specified exception handling mode, determine and store the specified exception handling mode as the exception handling mode corresponding to the user identifier and the application identifier; or when determines that the list of exception handling modes does not include the specified exception handling mode, send the list of exception handling modes to the first client, receive an exception handling mode selected by the first client from the list of exception handling modes, and determine and store the exception handling mode selected by the first client as the exception handling mode corresponding to the user identifier and the application identifier; where the second determining unit 503b is further configured for the virtual management server to: when the first connection request carries the application identifier, the user identifier, and a specified exception handling mode, determine and store the specified exception handling mode as the exception handling mode corresponding to the user identifier and the application identifier.

Figure 8:
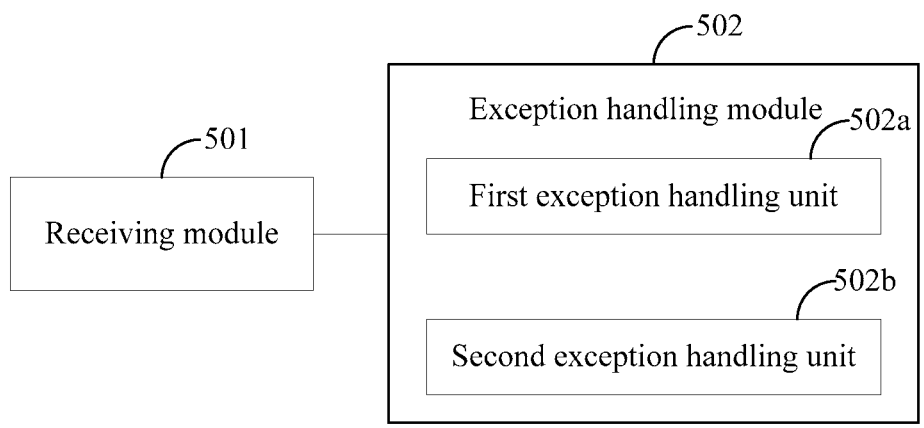
FIG. 8 is a schematic structural diagram of an exception handling apparatus according to an embodiment of the present invention.

FIG. 8 is a schematic structural diagram of an exception handling apparatus according to an embodiment of the present invention. The apparatus includes a receiving module 501 and an exception handling module 502.

The exception handling module 502 includes:

a first exception handling unit 502a, configured to: when the exception handling mode corresponding to the user identifier and the application identifier is an application storage mode, determine, according to preset logic of the application, that running data of the application needs to be stored, obtain, from the virtual machine according to a configuration file of the application, user personal data indicated by the configuration file, store the user personal data, the application identifier, and the user identifier to a data storage server, quit the application, release the resources of the virtual machine, and update a state of the virtual machine; and a second exception handling unit 502b, configured to: when the exception handling mode corresponding to the user identifier and the application identifier is a virtual machine state storage mode, generate snapshot data of the virtual machine according to the current state of the virtual machine, store the generated snapshot data of the virtual machine, the application identifier, virtual machine information, a virtual machine identifier, and the user identifier to the data storage server, release the resources of the virtual machine, and update the state of the virtual machine.

Figure 9:
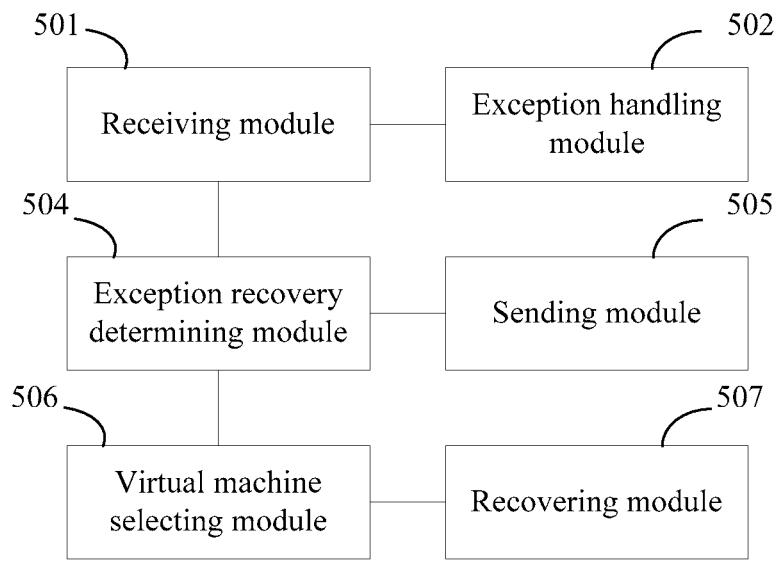
FIG. 9 is a schematic structural diagram of an exception handling apparatus according to an embodiment of the present invention.

FIG. 9 is a schematic structural diagram of an exception handling apparatus according to an embodiment of the present invention. The apparatus includes a receiving module 501 and an exception handling module 502.

The receiving module 501 is further configured to receive a second connection request sent by a second client, where the second connection request carries the user identifier and the application identifier; and the apparatus further includes:

an exception recovery determining module 504, configured to determine, according to the second connection request, that an application indicated by the second connection request requires exception recovery;

a sending module 505, configured to send an exception recovery query message to the second client;

a virtual machine selecting module 506, configured to select, when an exception recovery request of the second client is received, a target virtual machine according to the user identifier and the application identifier that are carried in the second connection request; and a recovering module 507, configured to recover an application with an exception on the target virtual machine.

The exception recovery determining module 504 is specifically configured to determine that data to be recovered which corresponds to the application identifier and the user identifier is stored in the data storage server.

Figure 10:
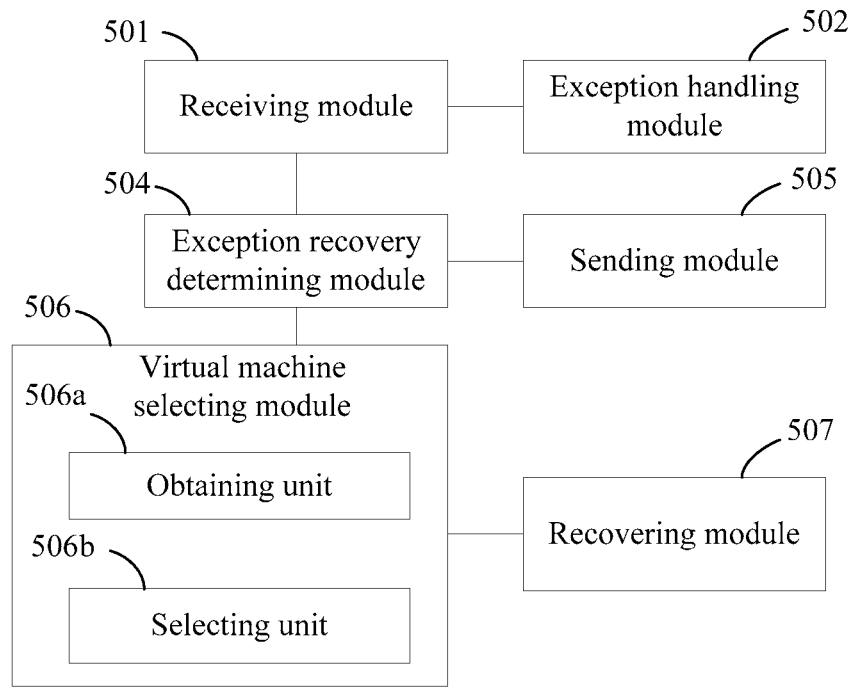
FIG. 10 is a schematic structural diagram of an exception handling apparatus according to an embodiment of the present invention.

FIG. 10 is a schematic structural diagram of an exception handling apparatus according to an embodiment of the present invention. The apparatus includes: a receiving module 501, an exception handling module 502, an exception recovery determining module 504, a sending module 505, a virtual machine selecting module 506, and a recovering module 507.

The virtual machine selecting module 506 includes:

an obtaining unit 506a, configured to obtain, from the data storage server, data to be recovered which corresponds to the application identifier and the user identifier; and a selecting unit 506b, configured to: when the data to be recovered is the data of the virtual machine, select the target virtual machine according to the data of the virtual machine; where the selecting unit 506b is further configured to: when the data to be recovered is the application data, select the target virtual machine according to the application identifier.

When the data to be recovered is the data of the virtual machine, the data to be recovered includes the snapshot data of the virtual machine, virtual machine information, and virtual machine identifier; and the selecting unit 506b is specifically configured to determine whether a virtual machine corresponding to the virtual machine identifier is idle, and when the virtual machine corresponding to the virtual machine identifier is idle, use the virtual machine corresponding to the virtual machine identifier as the target virtual machine; and the selecting unit 506b is further configured to: when the virtual machine corresponding to the virtual machine identifier is not idle, select an idle virtual machine matching the virtual machine information as the target virtual machine.

The selecting unit 506b is further configured to: when the data to be recovered is the application data, select a first virtual machine from idle virtual machines as the target virtual machine according to the application identifier, where the first virtual machine is a virtual machine that supports running of the application indicated by the application identifier.

Figure 11:
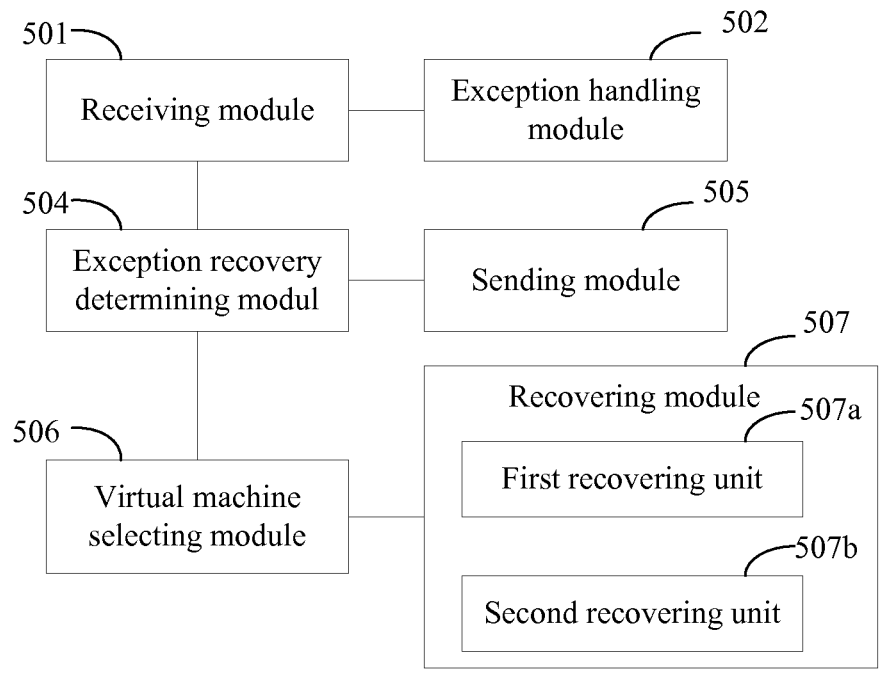
FIG. 11 is a schematic structural diagram of an exception handling apparatus according to an embodiment of the present invention.

FIG. 11 is a schematic structural diagram of an exception handling apparatus according to an embodiment of the present invention. The apparatus includes: a receiving module 501, an exception handling module 502, an exception recovery determining module 504, a sending module 505, a virtual machine selecting module 506, and a recovering module 507.

The recovering module 507 includes:

a first recovering unit 507a, configured to: when the data to be recovered is the data of the virtual machine, start the target virtual machine according to the snapshot data of the virtual machine in the data of the virtual machine to directly recover an application with an exception; and a second recovering unit 507b, configured to: when the data to be recovered is the application data, start the virtual machine, copy the application data to the target virtual machine, and run, according to the application data, an application with an exception on the target virtual machine.

The sending module 505 is further configured to send the virtual machine identifier to a client, so that the client establishes a communication connection with the virtual machine according to the virtual machine identifier and performs data interaction with the virtual machine.

An embodiment of the present invention further provides a virtual management server, including the exception handling apparatus in any one of the above embodiments. The virtual management servers or exception handling apparatuses provided by the embodiments in FIG. 5 to FIG. 11 of the present invention based on the same conception as the above method embodiments, and may be used to execute any one of the steps executed by the virtual management servers in FIG. 2 to FIG. 4A and FIG. 4B. The specific implementation process is not further described herein. For details, refer to the method embodiments. The virtual management server or exception handling apparatus provided by the embodiment of the present invention may be any device including a memory and/or a processor, for example, a computer, a notebook computer, a large workstation, a network device, and so on, which is not specifically limited by the present invention herein. In the present invention, the modules may be modules running in a processor, or units are modules or units running in a processor.

Figure 12:
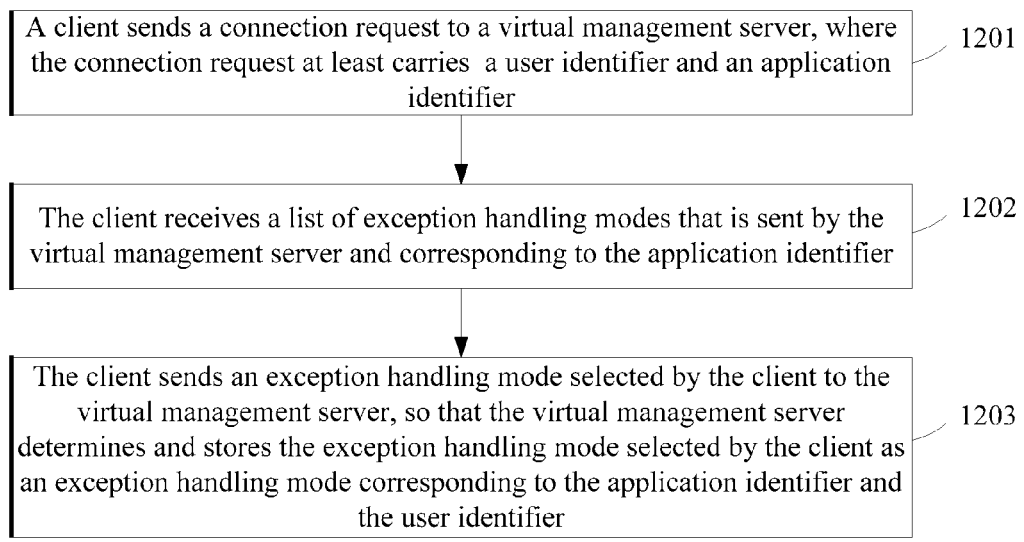
FIG. 12 is a flowchart of an exception handling method according to an embodiment of the present invention.

FIG. 12 is a flowchart of an exception handling method according to an embodiment of the present invention. Referring to FIG. 12, this embodiment specifically includes the following:

1201. A client sends a connection request to a virtual management server, where the connection request at least carries a user identifier and an application identifier.

1202. The client receives a list of exception handling modes that is sent by the virtual management server and corresponding to the application identifier.

1203. The client sends an exception handling mode selected by the client to the virtual management server, so that the virtual management server determines and stores the exception handling mode selected by the client as an exception handling mode corresponding to the application identifier and the user identifier.

The connection request carries the user identifier, the application identifier, and a specified exception handling mode; and the receiving, by the client, a list of exception handling modes that is sent by the virtual management server and corresponding to the application identifier specifically includes:

when the virtual management server determines that the list of exception handling modes does not include the specified exception handling mode, receiving, by the client, the list of exception handling modes that is sent by the virtual management server.

The method further includes:

receiving, by the client, an exception recovery query message sent by the virtual management server, and sending an exception recovery request or exception recovery reject message to the virtual management server, so that the virtual management server performs a corresponding operation according to the exception recovery request or exception recovery reject message.

By using the method provided by this embodiment, a client and a virtual management server determine an exception handling mode used when an exception occurs, so that the virtual management server receives an exception notification indicating an exceptional interruption as early as possible, and store application data or data of the virtual machine according to the exception handling mode corresponding to the client, and release resources of a virtual machine. Therefore, different exception handling methods can be customized for different applications and different users according to requirements, the client can also store a usage state of a user at exception occurrence time or at the time nearest to the exception occurrence time, and the capacity and efficiency of an online application system are improved.

Figure 13:
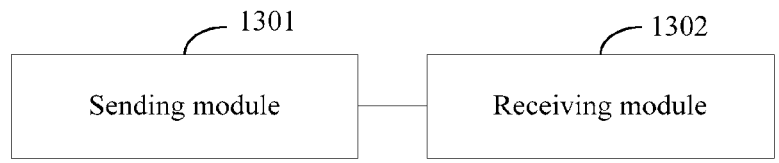
FIG. 13 is a schematic structural diagram of a client according to an embodiment of the present invention.

FIG. 13 is a flowchart of a client according to an embodiment of the present invention. Referring to FIG. 13, this embodiment specifically includes:

a sending module 1301, configured to send a connection request to a virtual management server, where the connection request at least carries a user identifier and an application identifier;

a receiving module 1302, configured to receive a list of exception handling modes that is sent by the virtual management server and corresponding to the application identifier; where the sending module 1301 is further configured to send an exception handling mode selected by the client to the virtual management server, so that the virtual management server determines the exception handling mode selected by the client as an exception handling mode corresponding to the application identifier and the user identifier.

The connection request carries the user identifier, the application identifier, and a specified exception handling mode; and the receiving module 1302 is specifically configured to: when the virtual management server determines that the list of exception handling modes does not include the specified exception handling mode, receive the list of exception handling modes that is sent by the virtual management server.

The sending module 1301 is further configured to send an exception recovery request or exception recovery reject message to the virtual management server when the receiving module receives an exception recovery query message sent by the virtual management server, so that the virtual management server performs a corresponding operation according to the exception recovery request or exception recovery reject message.

The client in the embodiment of the present invention may be a client in an online application, and may specifically be a PC, a mobile phone, a PDA, a TV set connected to a remote control (or a game handle), and so on. The sending module and receiving module of the client may be a transceiver of each client device. The client provided by this embodiment is based on the same conception as the method embodiments, and may execute any one of the steps executed by the client (including the first client and second client) in FIG. 2 to FIG. 4A and FIG. 4B and FIG. 12. The specific implementation process is not further described herein. For details, refer to the method embodiments.

A person of ordinary skill in the art may understand that, all or a part of the steps in the embodiments may be performed by hardware or may be performed by a program instructing relevant hardware. The program may be stored in a computer readable storage medium, and the storage medium may be a read only memory, a magnetic disk, an optical disk, or the like.

The above descriptions are merely exemplary embodiments of the present invention, but are not intended to limit the present invention. Any modification, equivalent substitution, improvement, and so on made within the principle of the present invention shall fall within the protection scope of the present invention.

What is claimed is:

1. An exception handling method performed by a virtual management server, the method comprising:
    receiving a first connection request sent by a client to run an application, wherein the first connection request carries a user identifier, an application identifier of the application and a specified exception handling mode;
    determining and storing the specified exception handling mode as an exception handling mode corresponding to the user identifier and the application identifier;
    selecting a virtual machine to run the application, wherein the client establishes connection with the virtual machine to use the application;
    receiving an exception notification sent by the virtual machine, wherein the exception notification carries the user identifier and the application identifier of the application interrupted by exception;
    storing virtual machine data or application data of the application to a data storage server based on the exception handling mode, wherein a virtual machine state storage mode stores the virtual machine data, including at least a snapshot of a current state of the virtual machine and wherein an application storage mode stores the application data including at least user personal data;
    releasing resources of the virtual machine;
    receiving a second connection request sent by the client, wherein the second connection request carries the same user identifier and the application identifier of the first connection request, wherein the application indicated by the second connection request requires exception recovery;
    obtaining data to be recovered from the data storage server; and
    when the data to be recovered is the application data, selecting any one of idle virtual machines that supports the application as a selected virtual machine, wherein the application data is copied to the selected virtual machine and the application interrupted by the exception is run on the selected virtual machine according to the application data.

2. The method according to claim 1, wherein the determining and storing the exception handling mode comprises:
    obtaining, according to the application identifier, a list of exception handling modes that are supported by the application, and determining whether the list of exception handling modes comprises the specified exception handling mode; and
    when the list of exception handling modes comprises the specified exception handling mode, determining and storing the specified exception handling mode as the exception handling mode corresponding to the user identifier and the application identifier; and
    when the list of exception handling modes does not comprise the specified exception handling mode, sending the list of exception handling modes to the client, receiving an exception handling mode selected by the client from the list of exception handling modes, and determining and storing the exception handling mode selected by the client as the exception handling mode corresponding to the user identifier and the application identifier.

3. The method according to claim 1, wherein the storing the application data of the application comprises:
    when the exception handling mode corresponding to the user identifier and the application identifier is the application storage mode,
    determining, according to preset logic of the application, that running data of the application needs to be stored;
    obtaining, from the virtual machine according to a configuration file of the application, the user personal data indicated by the configuration file;
    storing the user personal data, the application identifier, and the user identifier to the data storage server;
    quitting the application;
    releasing the resources of the virtual machine; and
    updating the state of the virtual machine.

4. The method according to claim 1, wherein the storing the virtual machine data comprises:
    when the exception handling mode corresponding to the user identifier and the application identifier is the virtual machine state storage mode,
    generating the snapshot of the virtual machine according to the current state of the virtual machine,
    storing the generated snapshot of the virtual machine, the application identifier, virtual machine information, a virtual machine identifier, and the user identifier to the data storage server,
    releasing the resources of the virtual machine, and
    updating the state of the virtual machine.

5. The method according to claim 1, wherein the receiving the second connection request comprises:
    sending an exception recovery query message to the client;
    receiving an exception recovery request of the client, and selecting any of the idle virtual machines according to the user identifier and the application identifier that are carried in the second connection request; and
    recovering the application interrupted by the exception on the selected virtual machine.

6. The method according to claim 5, further comprising wherein obtaining the data to be recovered comprises:

obtaining, from the data storage server, the data to be recovered which corresponds to the application identifier and the user identifier; and when the data to be recovered is the virtual machine data, selecting a virtual machine according to the data of virtual machine data.

7. The method according to claim 5, wherein after the step of recovering, the method further comprises:

sending a virtual machine identifier to the client, so that the client establishes a communication connection with the selected virtual machine according to the virtual machine identifier and performs data interaction with the selected virtual machine.

8. The method according to claim 1, wherein the specified exception handling mode is determined from a list of exception handling modes that are supported by the application.

9. An exception handling apparatus, comprising:

a computing hardware and a non-transitory computer-readable storage medium including computer-executable instructions executed by the computing hardware to perform operations comprising:

receiving a first connection request sent by a client to run an application, wherein the first connection request carries a user identifier, an application identifier of the application and a specified exception handling mode;

determining and storing the specified exception handling mode as an exception handling mode corresponding to the user identifier and the application identifier;

selecting a virtual machine to run the application, wherein the client establishes connection with the virtual machine to use the application;

receiving an exception notification sent by the virtual machine, wherein the exception notification carries the user identifier and the application identifier of the application interrupted by exception;

storing virtual machine data or application data of the application to a data storage server based on the exception handling mode, wherein virtual machine state storage mode stores the virtual machine data including at least a snapshot of a current state of the virtual machine, and wherein an application storage mode stores the application data including at least user personal data;

releasing resources of the virtual machine;

receiving a second connection request sent by the client, wherein the second connection request carries the same user identifier and the application identifier of the first connection request, wherein the application indicated by the second connection request requires exception recovery;

obtaining data to be recovered from the data storage server; and when the data to be recovered is the application data, selecting any one of idle virtual machines that supports the application as a selected virtual machine, wherein the application data is copied to the selected virtual machine and the application interrupted by the exception is run on the selected virtual machine according to the application data.

10. The apparatus according to claim 9, wherein the determining and storing the exception handling mode corresponding to the user identifier and the application identifier comprises:

obtaining, according to the application identifier, a list of exception handling modes that are supported by the application;

determining whether the list of exception handling modes comprises the specified exception handling mode; and when the list of exception handling modes comprises the specified exception handling mode, determining and storing the specified exception handling mode as the exception handling mode corresponding to the user identifier and the application identifier; and when the list of exception handling modes does not comprise the specified exception handling mode, sending the list of exception handling modes to the client, receiving an exception handling mode selected by the client from the list of exception handling modes, and determining and storing the exception handling mode selected by the client as the exception handling mode corresponding to the user identifier and the application identifier.

11. The apparatus according to claim 9, wherein the storing the virtual machine data and the application data of the application comprises:

when the exception handling mode corresponding to the user identifier and the application identifier is the application storage mode, determining, according to preset logic of the application, that running data of the application needs to be stored, obtaining, from the virtual machine according to a configuration file of the application, the user personal data indicated by the configuration file, storing the user personal data, the application identifier, and the user identifier to the data storage server, quitting the application, releasing the resources of the virtual machine, and updating the state of the virtual machine; and when the exception handling mode corresponding to the user identifier and the application identifier is the virtual machine state storage mode, generating the snapshot of the virtual machine according to the current state of the virtual machine, storing the generated snapshot of the virtual machine, the application identifier, virtual machine information, a virtual machine identifier, and the user identifier to the data storage server, releasing the resources of the virtual machine, and updating the state of the virtual machine.

12. The apparatus according to a claim 9, wherein the receiving the second connection request comprises:

sending an exception recovery query message to the client;

selecting, when an exception recovery request of the client is received, a virtual machine according to the user identifier and the application identifier that are carried in the second connection request; and recovering the application interrupted by the exception on the selected virtual machine.

13. The apparatus according to claim 12, wherein the selecting the virtual machine according to the user identifier and the application identifier that are carried in the second connection request comprises:

obtaining, from the data storage server, the data to be recovered which corresponds to the application identifier and the user identifier; and when the data to be recovered is the virtual machine data, selecting a virtual machine according to the virtual machine data.

14. The apparatus according to claim 12, wherein the operations further comprise sending a virtual machine identifier to the client, so that the client establishes a communication connection with the selected virtual machine according to the virtual machine identifier and performs data interaction with the selected virtual machine.

15. The apparatus according to claim 9, wherein the specified exception handling mode is determined from a list of exception handling modes that are supported by the application.

* * * * *

UNITED STATES PATENT AND TRADEMARK OFFICE
CERTIFICATE OF CORRECTION

PATENT NO. : 9,740,515 B2  
APPLICATION NO. : 14/143946  
DATED : August 22, 2017  
INVENTOR(S) : Qin et al.

Page 1 of 1

It is certified that error appears in the above-identified patent and that said Letters Patent is hereby corrected as shown below:

Column 24, Line 66, Claim 6 "further comprising" should be deleted.

Column 25, Line 5, Claim 6 "data of" should be deleted.

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*